Figure 1:
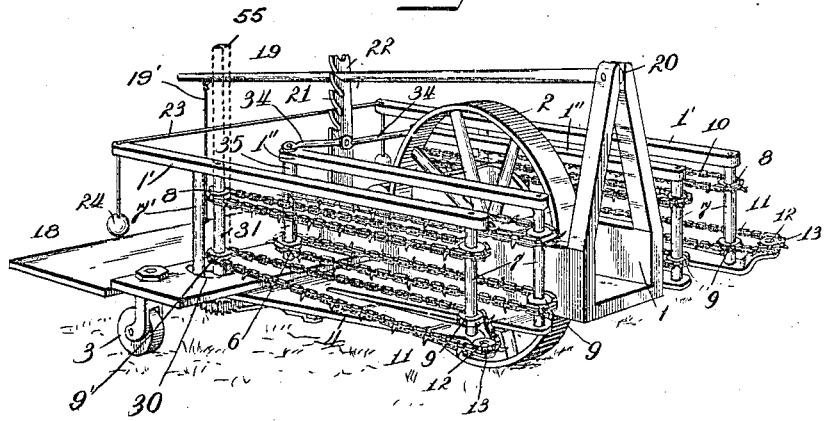

No. 831,880. PATENTED SEPT. 25, 1906.
H. LARSON.
CORN HARVESTER AND SHOCKER.
APPLICATION FILED AUG. 2, 1905.

2 SHEETS—SHEET 1.

Witnesses
Inventor
Hans Larson
by Henry W. Copp
his Attorney

No. 831,880.
PATENTED SEPT. 25, 1906.
H. LARSON.
CORN HARVESTER AND SHOCKER.
APPLICATION FILED AUG. 2, 1905.
2 SHEETS—SHEET 2.
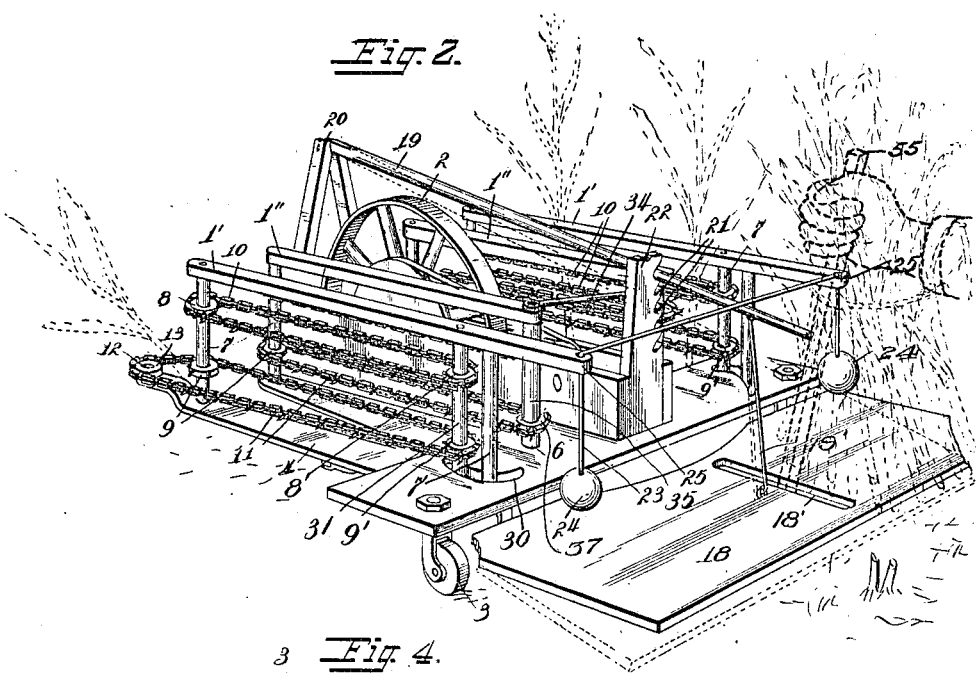
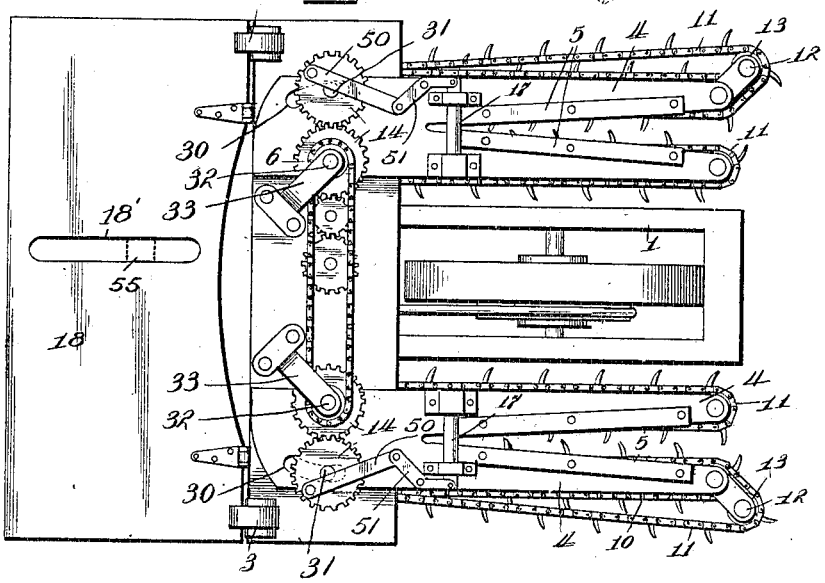

UNITED STATES PATENT OFFICE.

HANS LARSON, OF JOY, MINNESOTA.

CORN HARVESTER AND SHOCKER.

No. 831,880.  Specification of Letters Patent.  Patented Sept. 25, 1906.

Application filed August 2, 1905. Serial No. 272,329

*To all whom it may concern:*

Be it known that I, HANS LARSON, a citizen of the United States, residing at Joy, county of Ottertail, and State of Minnesota, have invented certain new and useful Improvements in Corn Harvesters and Shockers, of which the following is a specification.

My invention relates to corn harvesters and shockers.

The object of the present invention is the provision of a corn harvester and shocker which can be operated by one man and will be adapted for adjustment according to the distance between the rows or hills to meet varying conditions met with in corn-harvesting; further, to provide improved means for gathering in tangled corn and for severing or cutting the corn and automatically passing it to the shocking-platform; also, to provide an improved arrangement of shocking-platform on which the operator can stand and shock the corn and afterward lower the shock to the ground, a further object being the provision of improved means for guiding the severed corn and assisting in the shocking operation carried out by the operator, while my object is generally to provide a machine of the class described which will be light, inexpensive, and satisfactory in operation.

Having the foregoing objects and others not specifically mentioned in view, the invention consists of certain features of construction and novel combinations of parts set forth in the drawings and hereinafter described and claimed.

Figure 5:
Figure 3:
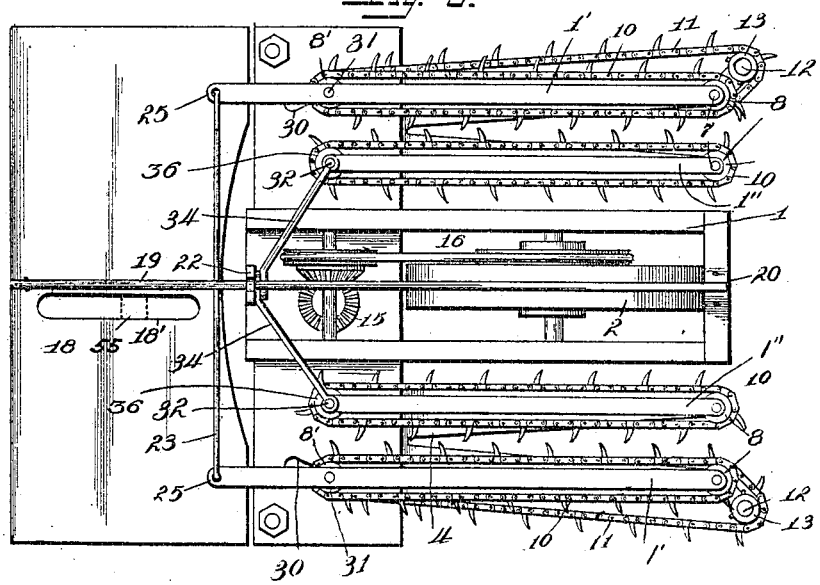

In the accompanying drawings, Figure 1 is a front perspective view of the machine; Fig. 2, a rear perspective, dotted lines showing how the shock is formed and the platform dropped; Fig. 3, a plan view; Fig. 4, a bottom view; Fig. 5, a detail of the severing-knives; and Fig. 6 a detail showing the manner of pivoting the corn-gatherers, so that they can be adjusted toward or away from each other according to the distance between the rows of corn.

The frame of the machine is shown at 1 and has the large traction-wheel 2 and the smaller trailing-wheels 3. The bottom frames 4 of the corn-gatherers each have a slot extending inwardly from the forward end of the machine for the admission of the standing corn, these bottom frames having the severing knives or cutters 5, and said frames are pivoted to the rear portion of frame 1 at 6, as shown in Fig. 6, which permits the bottom frames 4 and the entire superstructure now to be described of said corn-gatherers to be adjusted toward or away from each other, so that the slots in the bottom frames will be properly spaced to simultaneously receive corn from two rows or hills between which the horse drawing the machine is traveling.

Rising from the forward ends of the bottom frames 4 and secured thereto are brace rods or shafts 7, whose upper ends are secured to the frame-pieces 1' and 1''. Loose on said shafts 7 are upper and lower sprocket-wheels 8 and 9, around which pass the upper and lower gathering-chains 10 and 11, having suitable fingers. Supplemental short vertical rods or stub-shafts 12 are secured to the frame 1 and located in an offset manner from the forward vertical shafts, and the lower gathering-chains pass around sprocket-wheels 13, loose on said shafts 12. This construction satisfactorily provides for raising and drawing into the slots in the bottom frame 4 any tangled or matted corn.

Secured to the outer frame-pieces 1' and to the bottom frames 4 are upright brace rods or shafts 7', which pass freely through arc-shaped slots 30 in the frame 1 and are secured to bottom frames 4. Disposed vertically and parallel to said shafts 7' and journaled in the outer frame-pieces 1' and also journaled in the bottom frames 4 are rotary shafts 31, which also pass through the slots 30. Said shafts 31 carry sprocket-wheels 8' and 9', around which run the outer upper and lower chains 10 and 11. Secured to the inner frame-pieces 1'' are brace rods or shafts 32, whose lower ends pass loosely through the bottom frames 4 and are secured to brackets 33, connected to the bottom of frame 1. Braces 34 connect the rods 32 to frame 1. Loose on rods 32 are sleeves 35, to which are fastened upper and lower sprocket-wheels 36 and 37, around which the inner upper and lower chains 10 and 11 pass. The sleeves 35 and shafts 31 are provided with meshing gears 14, driven by a suitable gearing 15 and a chain 16 from the main wheel 2. To insure absolute severance of the corn, reciprocating sickles or cutters 17 may be employed, which are operated from gears 14 by pitmen 50 and bell-crank levers 51.

Hinged to the rear portion of frame 1 is a shocking-platform 18, having a slot 18' extending forwardly and rearwardly thereof, said platform being adapted to be held at the desired position to permit the shock to be slid therefrom onto the ground at the proper time. This platform is sustained at any desired height by a link 19' and a beam 19, pivoted to the front of the frame 1 at 20 and adapted to be rested in any one of a number of notches 21 on a plate 22 at the rear of the frame 1. This beam 19, in addition to sustaining the platform 18, also assists in maintaining the corn in upright position as it is being shocked on said platform 18. A cord 23, having free depending ends provided with weights 24, runs freely through guides 25, and the severed corn fed backwardly by the gathering-chains is crowded against this cord onto the platform and by the cord, in connection with the beam 19, held in upright position until a shock of suitable size has been formed, whereupon the operator standing on the platform 18 binds or ties the shock, passes a stake 55 through slot 18' and presses it into the ground in advance of the shock, so that the continuing movement of the machine brushes the shock from the platform to the ground and leaves it in standing position, the operator meanwhile superintending the formation of another shock and also withdrawing the stake before it reaches the rear end of slot 18'. In this manner the shocks may be formed without necessitating the stopping of the horse or requiring the operator to get off the machine.

Having thus described my invention, what I claim as new, and desire to secure by Letters Patent, is—

1. In a corn-harvester, the combination with a machine-frame, of corn-gatherers to take corn from two rows at the same time, each comprising a bifurcated frame pivotally connected to the machine-frame for lateral movement, and a conveyer carried by said bifurcated frame adapted to pass the corn through the bifurcated frame.

2. In a corn-harvester, the combination with a machine-frame, of corn-gatherers to take corn from two rows at the same time, each comprising a bifurcated frame pivotally connected to the machine-frame for lateral movement, and a pair of conveyers carried by each bifurcated frame and disposed on opposite sides of the bifurcation thereof, said conveyers being adapted to pass the corn through the bifurcated frame.

In testimony whereof I hereunto affix my signature in presence of two witnesses.

HANS LARSON.

Witnesses:
A. J. CAMPBELL,
J. C. SIMPSON.